United States Patent
Shim et al.

(10) Patent No.: US 8,872,394 B2
(45) Date of Patent: Oct. 28, 2014

(54) LINEAR VIBRATION GENERATING APPARATUS

(75) Inventors: Soon-Koo Shim, Cheongwon-gun (KR); Kyung-Yang Jung, Cheongju-si (KR); Young-Bin Chong, Cheongju-si (KR); Bong-Joo Park, Seoul (KR)

(73) Assignee: Jahwa Electronics Co., Ltd., Cheongwon-gun, Chungcheongbuk-do (KR)

( * ) Notice: Subject to any disclaimer, the term of this patent is extended or adjusted under 35 U.S.C. 154(b) by 231 days.

(21) Appl. No.: 13/479,514

(22) Filed: May 24, 2012

(65) Prior Publication Data

US 2012/0319506 A1 Dec. 20, 2012

(30) Foreign Application Priority Data

Jun. 16, 2011 (KR) .................. 10-2011-0058727
Nov. 24, 2011 (KR) .................. 10-2011-0123446

(51) Int. Cl.
H02K 33/00 (2006.01)
B06B 1/04 (2006.01)
H02K 33/16 (2006.01)

(52) U.S. Cl.
CPC ............... B06B 1/045 (2013.01); H02K 33/16 (2013.01)
USPC .......................................................... 310/25

(58) Field of Classification Search
None
See application file for complete search history.

(56) References Cited

U.S. PATENT DOCUMENTS

| 7,791,456 B2 * | 9/2010 | Miura ........................ 340/407.1 |
| 2003/0114999 A1 | 6/2003 | Shimoda et al. |
| 2009/0121559 A1 * | 5/2009 | Lee ................................. 310/28 |
| 2010/0066182 A1 * | 3/2010 | Yamazaki et al. ............... 310/29 |
| 2010/0102646 A1 * | 4/2010 | Masami et al. ................. 310/29 |
| 2010/0259113 A1 * | 10/2010 | Lee et al. ........................ 310/23 |
| 2010/0277010 A1 * | 11/2010 | Jeon ................................. 310/25 |
| 2012/0169150 A1 | 7/2012 | Lee et al. |

FOREIGN PATENT DOCUMENTS

| CN | 1486528 A | | 3/2004 |
| CN | 101541441 A | | 9/2009 |
| JP | 2006007161 A | * | 1/2006 |
| KR | 10-0934584 B1 | | 12/2009 |
| KR | 10-2010-0120894 A | | 11/2010 |
| KR | 10-0995000 B1 | | 11/2010 |
| KR | 10-1055508 B1 | | 8/2011 |
| WO | 2011/102588 A1 | | 8/2011 |

* cited by examiner

Primary Examiner — Tran Nguyen
(74) Attorney, Agent, or Firm — Edwards Wildman Palmer LLP; Kongsik Kim (57) ABSTRACT

A linear vibration generating apparatus employed in a portable terminal is provided. The linear vibration generating apparatus includes a bracket, a coil inserted into the bracket, a stator inserted into the bracket and including a central yoke concentrically fixed to an interior space of the coil, a vibrator including a permanent magnet disposed to surround an outer periphery of the coil, and a resilient body fixed to the stator to support the vibrator.

23 Claims, 6 Drawing Sheets

LINEAR VIBRATION GENERATING APPARATUS

PRIORITY

This application claims the benefit under 35 U.S.C. §119 (a) of Korean patent applications filed in the Korean Industrial Property Office on Jun. 16, 2011 and assigned Serial No. 10-2011-0058727 and on Nov. 24, 2011 and assigned Serial No. 10-2011-0123446, the entire disclosure of each of which is hereby incorporated by reference.

BACKGROUND OF THE INVENTION

1. Field of the Invention

The present invention relates to a portable terminal. More particularly, the present invention relates to a linear vibration generating apparatus employed as a non-acoustic signal receiving apparatus.

2. Description of the Related Art

A linear vibration generating apparatus used for a non-acoustic signal receiving apparatus of a portable terminal has quick vibration characteristics compared to an existing eccentric rotary vibration motor due to its short motion stroke and a resilient force of a resilient body.

Such a linear vibration generating apparatus generally includes a vibrator having a permanent magnet and a stator for supporting the vibrator, in which case the permanent magnet is moved upward and downward due to a mutual interaction between an electromagnetic force generated when a current is applied to a coil disposed in the stator and a magnetic force generated in the permanent magnet, generating vibrations.

Figure 1:
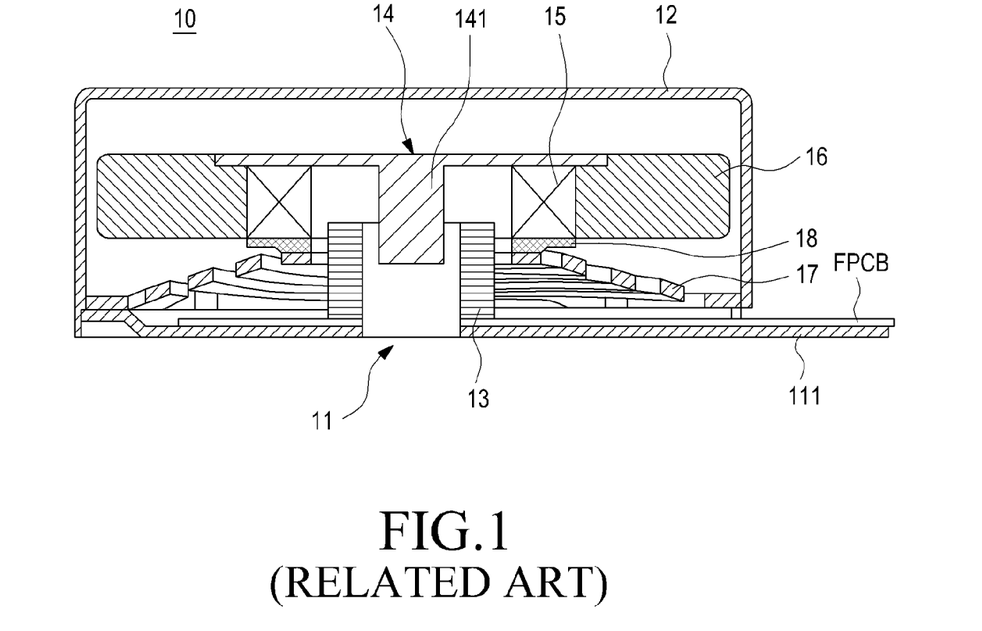
FIG. 1 is a sectional view illustrating a linear vibration generating apparatus according to the related art.

FIG. 1 is a sectional view illustrating a linear vibration generating apparatus according to the related art.

Referring to FIG. 1, an existing linear vibration generating apparatus 10 includes a vibrator 14 and a stator 11. The vibrator 14 includes a yoke 141 having a burring part 18, a permanent magnet 15, and a weight body 16, and the stator 11 includes an outer case 12, a bracket 111, and a coil 13.

The permanent magnet 15 is ring-shaped, the burring part 18 extends downward from the center of the yoke 141, and the weight body 16 is installed on an outer peripheral surface of the permanent magnet 15. The permanent magnet 15 is disposed coaxially with the coil 13 to form a magnetic circuit together with the yoke 141. A resilient body 17 is installed between the vibrator 14 and the bracket 111 to support the vibrator 14 during an operation of the vibrator 14. A Flexible Printed Circuit Board (FPCB) may be mounted on the bracket 111 and provided to supply electrical connections to the coil.

Since a portable terminal may be frequently dropped by a user while he/she uses the portable terminal employing the linear vibration generating apparatus, an impact generated due to the dropping may cause a central yoke to become separated in the linear vibration generating apparatus. Thereafter, the impact is transferred to a coil, causing the coil to break.

Furthermore, it is difficult to make the central yoke be concentric when the linear vibration generating apparatus is assembled. That is, although the central yoke should be assembled to be accurately concentric with the permanent magnet and the coil during the assembling process, the concentricity of the central yoke, which is made of a metal, may not be achieved due to a magnetic force of the permanent magnet. Accordingly, the assembling efficiency of the linear vibration generating apparatus is lowered, making it difficult to reduce manufacturing costs.

Therefore, a need exists for a linear vibration generating apparatus which can prevent the separation of a coil of a central yoke to prevent the coil from being broken and enhance an assembling efficiency related to a process of aligning the concentricity of the central yoke.

SUMMARY OF THE INVENTION

Aspects of the present invention are to address at least the above-mentioned problems and/or disadvantages and to provide at least the advantages described below. Accordingly, an aspect of the present invention is to provide a linear vibration generating apparatus which prevents a central yoke from being separated from a coil to solve a coil breaking phenomenon.

Another aspect of the present invention is to provide a linear vibration generating apparatus which enhances an assembling efficiency of a central yoke irrespective of an influence of a magnetic force of a permanent magnet.

Another aspect of the present invention is to provide a linear vibration generating apparatus which minimizes an impact generated during a vibration of a vibrator.

Another aspect of the present invention is to provide a linear vibration generating apparatus which prevents a vibrating force of a vibrator from being lowered by varying a shape of an upper yoke.

In accordance with an aspect of the present invention, a linear vibration generating apparatus is provided. The apparatus includes a stator including a bracket, a coil inserted into the bracket, a central yoke concentrically fixed to an interior space of the coil and inserted into the bracket, a vibrator including a permanent magnet disposed to surround an outer periphery of the coil, and a resilient body fixed to the stator to support the vibrator.

In accordance with another aspect of the present invention, a linear vibration generating apparatus is provided. The apparatus includes a vibrator and a stator configured to support the vibrator, wherein the stator includes a bracket having a hollow part protruding upward from a center thereof, a coil mounted on the hollow part to be fixed, and a central yoke press-fitted into the hollow part while being inserted into an interior space of the coil.

In accordance with another aspect of the present invention, a linear vibration generating apparatus is provided. The apparatus includes a vibrator including a permanent magnet, and a stator including a coil and configured to support the vibrator, wherein the stator includes a bracket where the coil is disposed, an outer case coupled to the bracket, and a central yoke, upper and lower ends of which are fixed to the outer case and the bracket, respectively.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Linear vibration generating apparatuses according to exemplary embodiments of the present invention will be described with reference to FIGS. 2 through 7.

FIGS. 2 through 9, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 2:
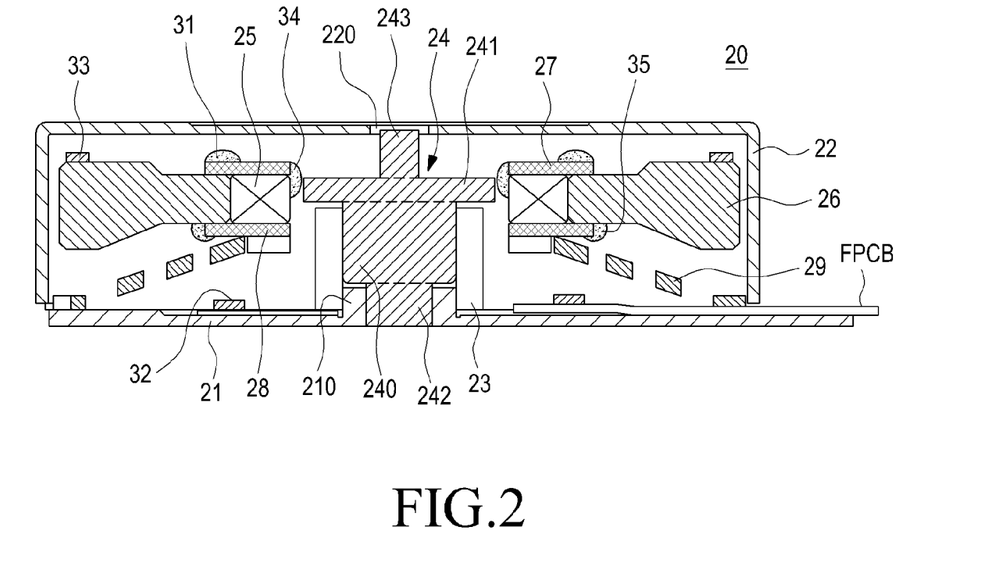
FIG. 2 is a sectional view illustrating a linear vibration generating apparatus according to a first exemplary embodiment of the present invention.

FIG. 2 is a sectional view illustrating a linear vibration generating apparatus according to a first exemplary embodiment of the present invention.

Referring to FIG. 2, a linear vibration generating apparatus 20 proposes a solution for preventing the separation of a central yoke (i.e., breaking of a coil) generated when a portable terminal is dropped and easily aligning concentricity (i.e., assembling a permanent magnet and a coil concentrically) during a central yoke assembling process, as compared with an existing linear vibration generating apparatus. The linear vibration generating apparatus 20 includes a vibrator, a stator, and a resilient body 29. The resilient body 29 installed between the stator and the vibrator is configured to support the vibrator. The stator and the vibrator are relative concepts. That is, the stator refers to a part fixed to the vibrator, and the vibrator refers to a part which vibrates relative to the stator.

The vibrator includes a permanent magnet 25 and a weight body 26. The stator includes an outer case 22, a bracket 21, a coil 23, and a central yoke 24. The permanent magnet 25 is disposed to surround an upper outer periphery of the coil 23, and the weight body 26 is installed on the permanent magnet 25. The coil 23 is disposed into the bracket 21, and the central yoke 24 is inserted into and fixed to the bracket 21 or press-fitted with the bracket 21 to be concentrically fixed within an interior space of the coil 23.

In the above-mentioned linear vibration generating apparatus 20, the central yoke 24 may be press-fitted with or inserted in the bracket 21, or the central yoke 24 may be press-fitted with, inserted into, or welded to the outer case 22. Such a central yoke fixing structure will be described later.

The bracket 21 has a fixing part 210 with which a lower portion of the central yoke 24 is press-fitted at a central portion thereof, i.e., the center of a vibrating shaft. Hereinafter, the fixing part 210 will be referred to as a hollow part 210. The hollow part 210 protrudes upward from the bracket 21 with a predefined height. In addition, the hollow part 210 has an inner surface and an outer surface. It is preferable if the protruding height of the hollow part 210 allows the central yoke 24 to be press-fitted with and fixed to the hollow part 210.

The central yoke 24 is made of a material, such as a metal, which serves as a magnetic material. The central yoke 24 is configured to be fixed to the bracket 21 and/or the outer case 22 while protecting the coil 23 and has a shape which is advantageous in aligning the permanent magnet 25 and the coil 23 concentrically. The central yoke 24 is press-fitted with the bracket 21 to form a magnetic circuit together with the permanent magnet 25. An interior of the central yoke 24 is filled, and the central yoke 24 extends vertically upward from the bracket 21 in a direction of vibrations. The central yoke 24 includes a cylindrical body portion 240, a cylindrical upper portion 241, and a cylindrical lower portion 242, which are integrally formed. The cylindrical upper portion 241 is inserted into and disposed within an interior space of the coil 23. The cylindrical upper portion 241 extends horizontally to the outside from the cylindrical body portion 240 to be disposed on the coil 23. The structure of the cylindrical upper portion 241 protects an upper end portion of the coil 23 from the permanent magnet 25 during vibrations. The cylindrical lower portion 242 has a diameter smaller than that of the cylindrical body portion 240, and protrudes from the center of the cylindrical body portion 240 downward to be press-fitted within the hollow part 210. In the coupling structure of the central yoke 24, the hollow part 210, and the coil 23, the coil 23 is mounted on the hollow part 210, and the central yoke 24 is press-fitted within the hollow part 210 while the cylindrical lower portion 242 is inserted into an interior space of the coil 23. When the cylindrical body portion 240 is press-fitted within the coil 23, an adhesive is additionally applied to prevent an insulation defect due to a damage to the coil 23, while increasing a coupling force between the cylindrical body portion 240 and the coil 23.

In addition, the central yoke 24 further includes a cylindrical upper end portion 243 protruding upward from the center of the cylindrical upper portion 242 to align the concentricity of the coil 23 and the central yoke 24 (i.e., the concentricity of the permanent magnet 25 and the central yoke 24). A concentricity opening 220 by which an upper end of the cylindrical upper end portion 242 is caught is formed on an upper surface of the outer case 22. That is, the cylindrical upper end portion 243 and the concentricity opening 220 serve to align the concentricity of the central yoke 240, preventing a concentricity defect. Thereafter, the concentricity opening 220 has a diameter slightly larger than that of the cylindrical upper end portion 243 and smaller than that of the cylindrical lower portion 242. That is, since the magnetic circuit function of the central yoke 24 is weakened if the diameter of the cylindrical upper end portion 243 becomes larger, the cylindrical upper end portion 243 preferably has a diameter large enough to allow the alignment of the concentricity of the central yoke 24 and the concentricity opening 220 preferably has a diameter slightly larger than the cylindrical upper end portion 243. The concentricity opening 220 has a protrusion protruding downward and having an outer diameter larger than that of the cylindrical upper end portion 243 to support and fix the cylindrical upper end portion 243, but may have a blind structure.

The cylindrical upper portion 241 of the central yoke 24 extends substantially from the bracket 21 to the permanent magnet 25. More particularly, the cylindrical upper portion 241 of the central yoke 24 is disposed substantially on the same plane as an upper surface of the permanent magnet 25. The inner surface of the coil 23 and the outer surface of the cylindrical body portion 240 may be disposed to face each other or contact each other. The inner surface of the permanent magnet 25 and the outer surface of the cylindrical upper portion 241 may define a gap with a certain interval between them or the cylindrical upper portion 241 may be attached and fixed to an upper portion of the coil 23 by means of an adhesive.

The outer case 22 forms a coin type outer shape of the linear vibration generating apparatus 20 together with the bracket 21 and is formed in a simple cover shape. The outer case 22 may be magnetic or nonmagnetic. As described above, the circular concentricity opening 220 is formed at the center of the upper surface of the outer case 22.

The permanent magnet 25 is ring-shaped, and has an upper surface, a lower surface, an outer surface, and an inner surface. The permanent magnet 25 is disposed to surround an outer periphery of the coil 23 concentrically with the coil 23 and the central yoke 24. An upper plate 27 and a lower plate 28 are installed on upper and lower surfaces of the permanent magnet 25, respectively. The upper plate 27 is ring-shaped and is made of a metal. The upper plate 27 is bonded and fixed to the upper surface of the permanent magnet 25. The lower plate 28 is ring-shaped and is made of a metal. The lower plate 28 is disposed between the lower surface of the permanent magnet 25 and an upper end of the resilient body 29, and is bonded and fixed to the lower surface of the permanent magnet 25 due to a mutual magnetic force. The upper and lower plates 27 and 28 are made of metal, which serves as a magnetic material, to prevent the leakage of an external magnetic field and contribute to the formation of a magnetic closed circuit. That is, since the upper and lower plates 27 and 28 act as magnetic materials, the magnetic circuit formed by the central yoke 24 and the permanent magnet 25 is concentrated toward the center of the coil 23.

The vibrator further includes a high density weight body 26 on an outer side of the permanent magnet 25. The weight body 26 is ring-shaped, and has an upper surface, a lower surface, an inner surface, and an outer surface. The weight body 26 surrounds the permanent magnet 25 with its inner surface, and an inner portion of the weight body 26 is surrounded by the upper plate 27 and the lower plate 28. More particularly, the inner surface of the weight body 26 is disposed to contact the outer surface of the permanent magnet 25. The outer surface of the permanent magnet 25 may be made of a non-magnetic material so that the magnetic circuit of the linear vibration generating apparatus 20 is concentrated toward its center.

The resilient body 29 is a leaf spring and is disposed to surround an outer periphery of the coil 23 between the bracket 21 and the permanent magnet 25. A diameter of the resilient body 29 becomes gradually larger as it goes from an upper end to a lower end thereof such that the upper end of the resilient body 29 always keeps contacting the lower plate 28 and the lower end thereof always keeps contacting the bracket 21. Specifically, the resilient body 29 is fixed by means of welding, etc.

Accordingly, the linear vibration generating apparatus 20 provides the vibrator with a vibrating force by means of the magnetic circuit formed by the permanent magnet 25 and the yoke 24 together with the coil 23. A Flexible Printed Circuit Board (FPCB) electrically connected to the coil 23 protrudes to the outside of the outer case 22.

Hereinafter, a structure for preventing the elements of the linear vibration generating apparatus 20 from colliding with each other will be described with reference to FIG. 2.

As illustrated in FIG. 2, the linear vibration generating apparatus 20 includes a plurality of impact preventing parts. A first vertical impact preventing part 31 is formed on the upper plate 27 by applying a magnetic fluid on the upper surface of the upper plate 27. The magnetic fluid may be applied on the upper plate 27 in a dotted form or a ring-like form. The first vertical impact preventing part 31 minimizes an impact between the vibrator and the outer case 22.

A second vertical impact preventing part 32 is formed on the bracket 21. The second vertical impact preventing part 32 may be formed of at least one of a rubber, a silicon resin or an expandable resin, such as a sponge. The second vertical impact preventing part 32 minimizes an impact between the resilient body 29 and the bracket 21.

A third vertical impact preventing part 33 is formed on the upper surface of the weight body 26. The third vertical impact preventing part 33 may be formed of at least one of a rubber, a silicon resin or an expandable resin, such as a sponge. The third vertical impact preventing part 33 minimizes an impact between the weight body 26 and the outer case 22 during an operation of the linear vibration generating apparatus 20.

A fourth vertical impact preventing part 35 is further formed between the weight body 26 and an outer peripheral surface of the lower plate 28. The fourth vertical impact preventing part 35 is formed of a magnetic fluid.

A horizontal impact preventing part 34 may be formed of a magnetic fluid and is further formed between the permanent magnet 25 and the cylindrical upper portion 241 of the central yoke 24. The horizontal impact preventing part 34 is located at a corner of the inner portion of the permanent magnet 25 and a magnetically concentrated portion of the upper plate 27 between the upper plate 27 and the cylindrical upper portion 241 of the central yoke 24. The horizontal impact preventing part 34 minimizes an impact between the cylindrical upper portion 241 and the permanent magnet 25 or the upper plate 27 during an operation of the linear vibration generating apparatus 20.

Linear vibration generating apparatuses according to the exemplary embodiments of the present invention will be described with reference to FIGS. 3 through 7. Although it has been described that the cylindrical lower portion 242 of the central yoke is inserted into or press-fitted with the hollow part 210 to be fixed, a structure where a cylindrical upper end portion 443 of the central yoke 44 is fixed to the outer case 42 will be described with reference to FIGS. 3 through 5, in which case the cylindrical upper end portion 443 of the central yoke 44 is inserted into, press-fitted with, or welded to the outer case 42 to be fixed to the outer case 42.

Figure 3:
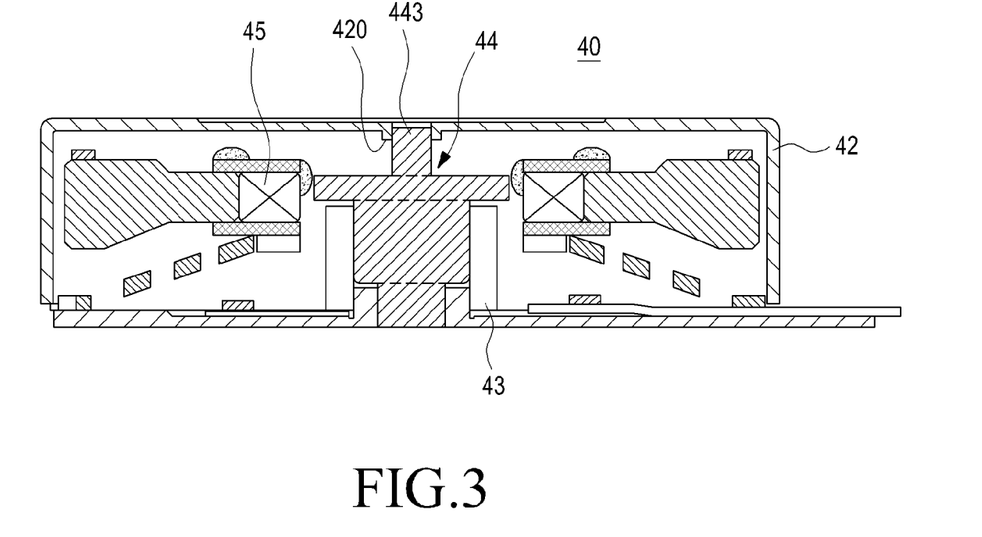
FIG. 3 is a sectional view illustrating a linear vibration generating apparatus according to a second exemplary embodiment of the present invention.

FIG. 3 is a sectional view illustrating a linear vibration generating apparatus according to a second exemplary embodiment of the present invention.

Referring to FIG. 3, in a linear vibration generating apparatus 40, a central yoke 44 is fixed to the center of the upper surface of an outer case 42 concentrically with a coil 43. A permanent magnet 45 is ring-shaped, and has an upper surface, a lower surface, an outer surface, and an inner surface. A hollow part 420 into which the central yoke 44 is inserted or press-fitted is formed at the center of the upper surface of the outer case 42. The hollow part 420 protrudes downward from the center of the upper surface of the outer case 42. The cylindrical upper end portion 443 of the central yoke 44 is inserted into or press-fitted with the interior of the hollow part 420 to be fixed. When the cylindrical upper end portion 443 of the central yoke 44 is inserted into or press-fitted with the interior of the hollow part 420, the central yoke 44 may be concentrically aligned, making it possible to enhance assembling efficiency.

Figure 4:
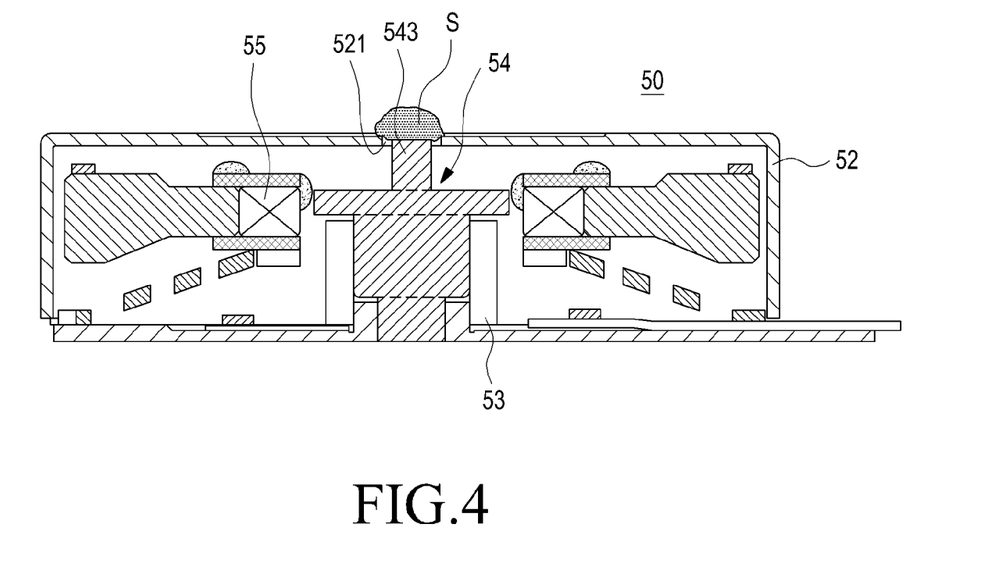
FIG. 4 is a sectional view illustrating a linear vibration generating apparatus according to a third exemplary embodiment of the present invention.

FIG. 4 is a sectional view illustrating a linear vibration generating apparatus according to a third exemplary embodiment of the present invention.

Referring to FIG. 4, in a linear vibration generating apparatus 50, a central yoke 54 is fixed to the center of the upper surface of an outer case 52 concentrically with a coil 53 and fixed to a concentricity opening 521 formed at the center of the upper surface of the outer case 52 by means of welding. A permanent magnet 55 is ring-shaped, and has an upper surface, a lower surface, an outer surface, and an inner surface. Although the concentricity opening 220 is formed over the cylindrical upper end portion 243 of the central yoke, in the linear vibration generating apparatus 20 of FIG. 2, the linear vibration generating apparatus 50 is fixed between an upper end of the cylindrical upper end portion 543 passing through the concentricity opening 521 and the concentricity opening 521 by means of welding. Thus, the cylindrical upper end portion 543 of the central yoke is concentrically fixed to the outer case 52 by means of a welding part S.

The central yoke may be fixed with a rivet structure which provides a fixing force similar to that of the welding structure.

Figure 5:
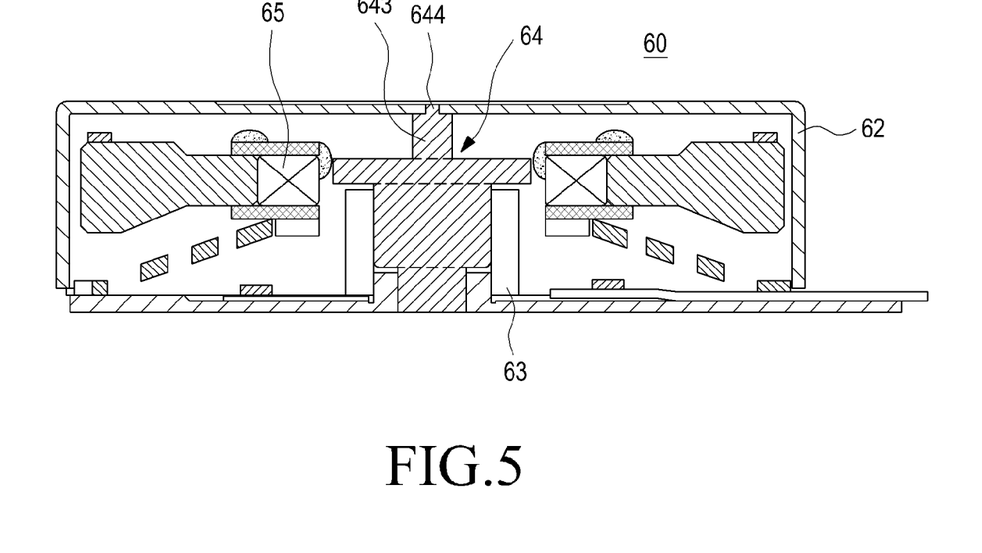
FIG. 5 is a sectional view illustrating a linear vibration generating apparatus according to a fourth exemplary embodiment of the present invention.

FIG. 5 is a sectional view illustrating a linear vibration generating apparatus according to a fourth exemplary embodiment of the present invention.

Referring to FIG. 5, in a linear vibration generating apparatus 60, a central yoke 64 is inserted into a concentricity opening formed at the center of an upper surface of an outer case 62 to be fixed. The central yoke 64 has a cylindrical pole 644 in a cylindrical upper end portion 643. The cylindrical pole 644 is inserted into the concentricity opening so that the central yoke 64 is fixed to the outer case 62 and a permanent magnet 65 and a coil 63 are concentrically aligned easily at the same time.

Referring back to FIG. 2, since the horizontal collision preventing part 34 is most preferably formed of a magnetic fluid, if the magnetic fluid is applied between the permanent magnet 25 and the cylindrical upper portion 241, a space between the permanent magnet 25 and the cylindrical upper portion 241 is filled with the horizontal collision preventing part 34 which is ring-shaped. Thus, the horizontal collision preventing part 34 seals a peripheral space where the coil 23 exists to a degree, lowering a vibration efficiency of the vibrator of the linear vibration generating apparatus 20. To address this problem, the shape of the cylindrical upper portion of the upper yoke or the central yoke may not be disk-shaped but may have other configurations.

Figure 8A:
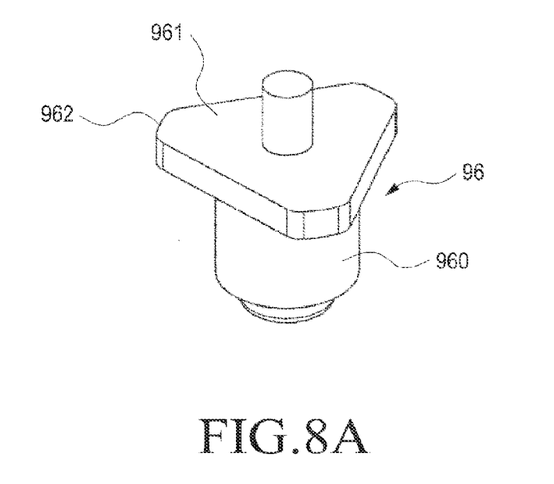
FIGS. 8A through 8C are perspective views illustrating various forms of a central yoke according to exemplary embodiments of the present invention.
Figure 8B:
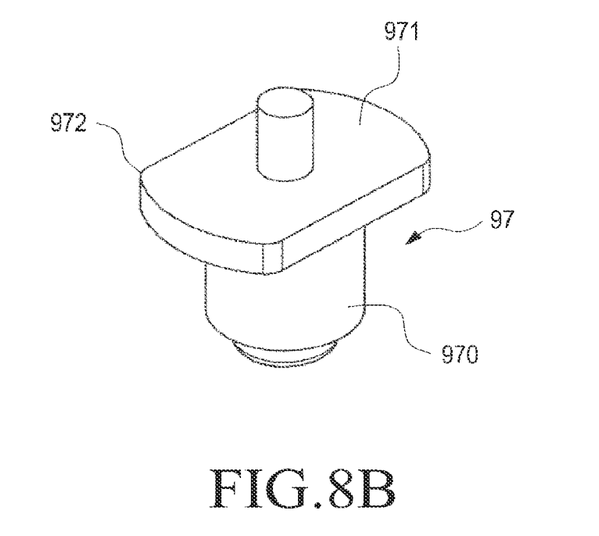
Figure 8C:
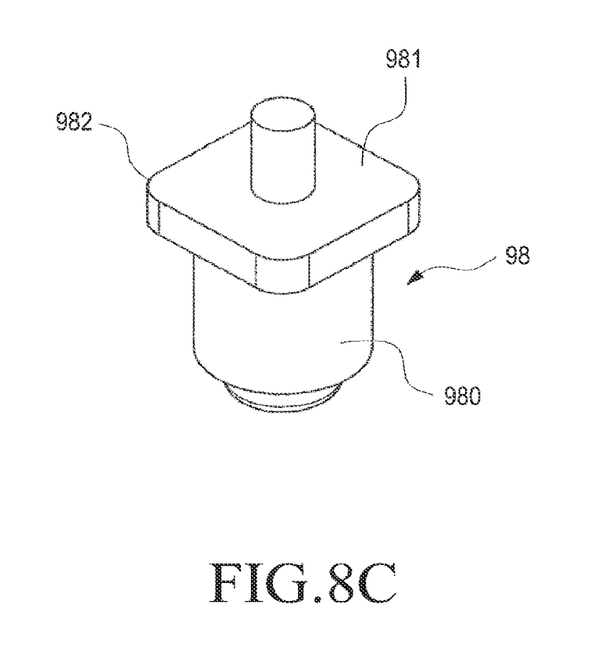

FIGS. 8A through 8C are perspective views illustrating various forms of a central yoke according to exemplary embodiments of the present invention. The central yoke extends from a cylindrical body to the outer side. An extending outer peripheral portion of the central yoke has at least one corner and the corner has a rounded shape.

Referring to FIG. 8A, a central yoke 96 has an outer peripheral portion extending to the outside from a cylindrical body 960. The shape of an outer peripheral portion 961 is substantially an equilateral triangle, and has rounded corners 962.

Referring to FIG. 8B, a central yoke 97 has an outer peripheral portion extending to the outside from a cylindrical body 970. The shape of an outer peripheral portion 971 is obtained by D-cutting opposite sides of a disk-like shape, and has rounded corners 972.

Referring to FIG. 8C, a central yoke 98 has an outer peripheral portion extending to the outside from a cylindrical body 980. The shape of an outer peripheral portion 981 is substantially a square, and has rounded corners 982.

The various shapes of the outer peripheral portions 961, 971, and 981 prevent a peripheral space where a coil exists from being sealed by a horizontal collision preventing part, such as a magnetic fluid, enhancing vibration efficiency during an operation of the linear vibration generating apparatus.

In order to achieve the above-mentioned effects, an inner surface of the upper plate is circular and the shape of the outer peripheral portion of the cylindrical upper portion which extends to the outside from the cylindrical upper portion of the central yoke to protect the coil has at least one rounded corner.

Figure 6:
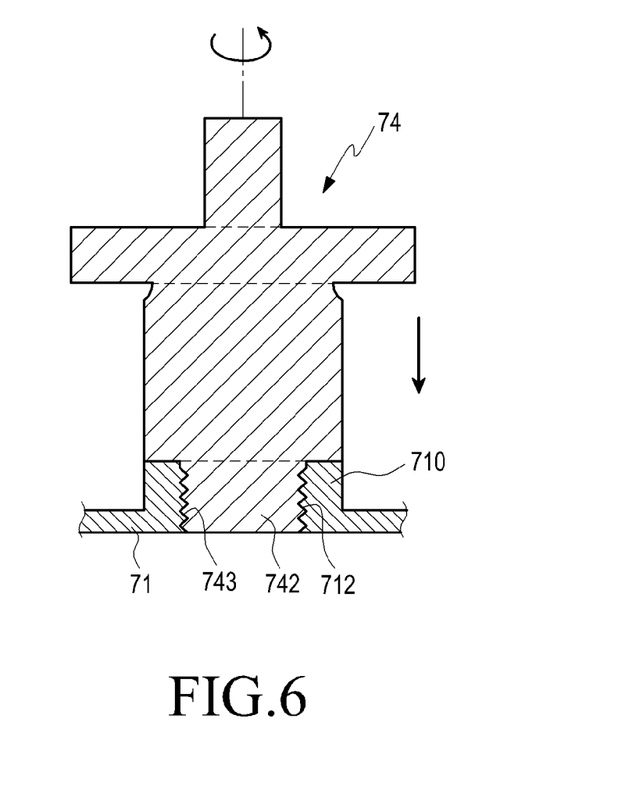
FIG. 6 is a sectional view illustrating a coupling structure between a central yoke and a hollow part in a linear vibration generating apparatus according to a fifth exemplary embodiment of the present invention.

FIG. 6 is a sectional view illustrating a coupling structure between a central yoke and a hollow part in a linear vibration generating apparatus according to a fifth exemplary embodiment of the present invention.

Referring to FIG. 6, the central yoke may be screw-coupled to the fixing part to be fixed in the linear vibration generating apparatus. The linear vibration generating apparatus has substantially the same structure as that of the linear vibration generating apparatus 20 of FIG. 2 except for a cylindrical lower portion 742 of the central yoke and a fixing part 710, and only the cylindrical lower portion 742 and the fixing part 710 will be described with reference to the drawings.

As illustrated in FIG. 6, the cylindrical lower portion 742 of the central yoke is screw-coupled to the fixing part 710 so that a central yoke 74 is coupled to the fixing part 710. To achieve this, a first threaded portion 743 is formed on an outer peripheral surface of the cylindrical lower portion 742. The fixing part 710 has a hollow portion protruding upward by a predefined length at a center of the bracket 71. Hereinafter, the fixing part 710 will be referred to as a hollow part. The hollow part 710 has a second threaded portion 712 engaged with the first threaded portion 743 on an inner surface thereof. Thus, if the central yoke 74 rotates, it is moved from the interior of the hollow part 710 to the lower side and is finally coupled and fixed to the hollow part 710.

Figure 7:
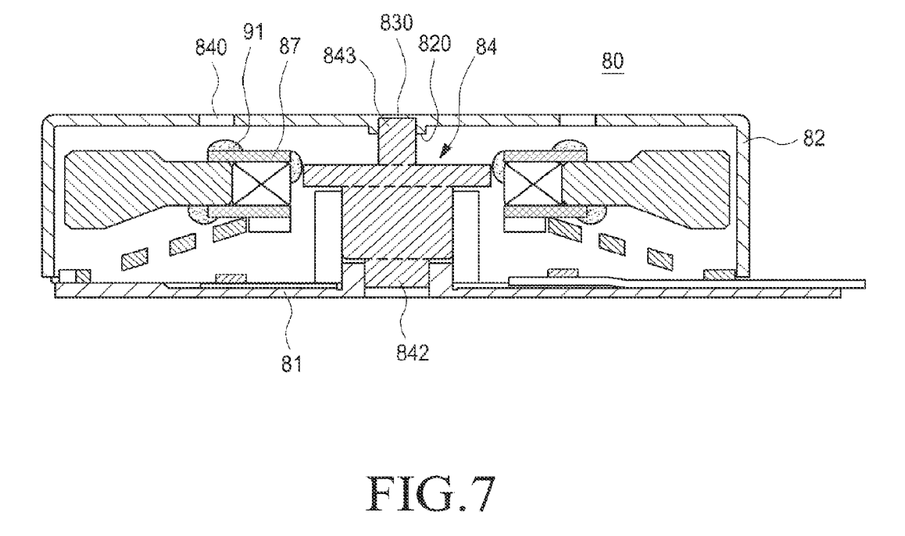
FIG. 7 is a sectional view illustrating a linear vibration generating apparatus according to a sixth exemplary embodiment of the present invention.

FIG. 7 is a sectional view illustrating a linear vibration generating apparatus according to a sixth exemplary embodiment of the present invention.

Referring to FIG. 7, a linear vibration generating apparatus 80 has substantially the same structure as that of the linear vibration generating apparatus 20 of FIG. 2 except for the cylindrical lower portion 842 of the central yoke and an outer case 82, and only the cylindrical lower portion 842 and the outer case 82 will be described with reference to the drawings.

As illustrated in FIG. 7, the linear vibration generating apparatus 80 may be fixed in such a manner that one surface of a central yoke 84 contacts a closed positioning portion 830 formed at the center of an upper surface of the outer case 82 to be supported by the positioning portion 830. A hollow part 820 into which the central yoke 84 is inserted or press-fitted is formed at the center of the upper surface of the outer case 82. A cylindrical upper end portion 843 of the central yoke 84 is supported by the positioning portion 830 formed on the upper surface of the outer case 82 and a cylindrical lower portion 842 of the central yoke 84 is inserted into and press-fitted with a bracket 81 to be fixed, making it possible to manage and maintain concentricity in spite of an external impact. The positioning portion 830 is recessed.

Holes 840, through which a first vertical collision preventing part 91 of an upper plate 87 may protrude, are formed in the outer case 82 so that an upper portion of the outer case 82 is substantially sealed.

The plurality of vertical and horizontal collision preventing parts shown in the drawings may be selectively applied, and the high density weight body may have a shape whose upper and lower portions are the same or different in the aspects of securing of a heavy weight and an inner gap.

Although it has been described with reference to FIG. 2 that the cylindrical lower portion 242 of the central yoke 24 is concentrically inserted into and press-fitted with the hollow part 210 of the bracket 21, only a configuration where a cylindrical upper end portion 943 of a central yoke 94 is concentrically disposed within an outer case 92 will be described with reference to FIG. 9 and a description of the remaining configurations will be omitted since they are already described with reference to FIG. 2.

Figure 9:
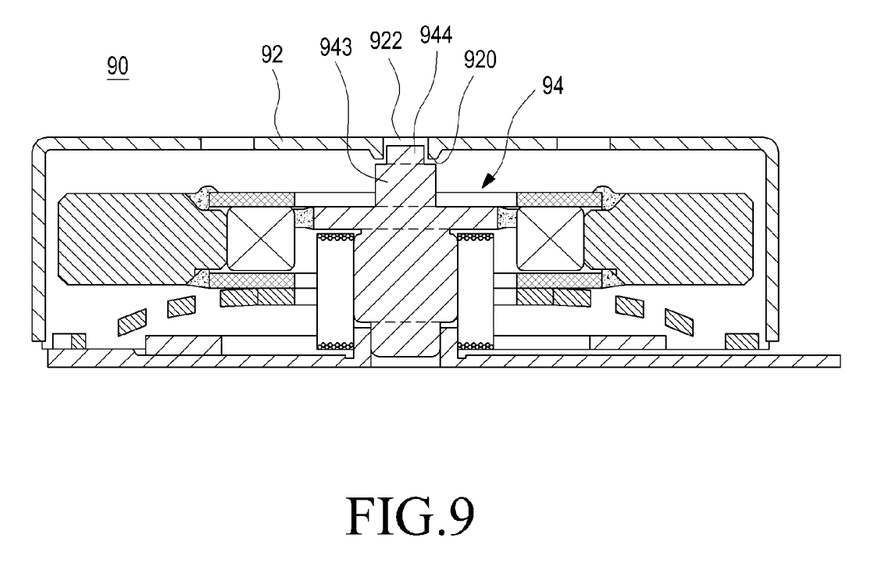
FIG. 9 is a sectional view illustrating a linear vibration generating apparatus according to a seventh exemplary embodiment of the present invention.

FIG. 9 is a sectional view illustrating a linear vibration generating apparatus according to a seventh exemplary embodiment of the present invention.

Referring to FIG. 9, in a linear vibration generating apparatus 90, a central yoke 94 is disposed concentrically with a coil at a center of an upper surface of the outer case 92, and a hollow part 920 is formed at the center of the upper surface of the outer case 92 to help concentrically align the central yoke 94 conveniently.

The hollow part 920 includes a concentricity opening 922 that extends downward from the center of the upper surface of the outer case 92. A cylindrical upper end portion 943 of the central yoke 94 is disposed within the hollow part 920. Insertion of the cylindrical upper end portion 943 into the hollow part 920 contributes to improvement in assembling efficiency as their concentricity may be easily adjusted during the assembling process of the central yoke 94. A cylindrical boss 944 is formed at an upper side of the cylindrical upper end portion 943 to help concentrically align the central yoke 94 in the concentricity opening 922 more conveniently. A diameter of the cylindrical boss 944 is made smaller than that of the cylindrical upper end portion 943 so as to be inserted into the hollow part 920. The cylindrical upper end portion 943 and the cylindrical boss 944 are stepped. The inner diameter of the hollow part 920, i.e., the diameter of the concentricity opening 922 is larger than the diameter of the cylindrical boss 944 and smaller than the diameter of the cylindrical upper end portion 943. Accordingly, the cylindrical upper end portion 943 is spaced apart from the hollow part 920 and the cylindrical boss 944 is inserted into the hollow part 920 while a gap exists between an outer peripheral surface of the cylindrical boss 944 and an inner peripheral surface of the hollow part 920.

As a result, the cylindrical upper end portion 943, the cylindrical boss 944, and the hollow part 920 contribute to the concentricity of the central yoke 94 when the central yoke 94 is assembled and fixed.

As mentioned above, the linear vibration generating apparatus according to an exemplary embodiment of the present invention may prevent the separation of the central yoke and may also prevent the breaking of the coil. More particularly, the central yoke may be easily aligned concentrically and assembling efficiency may be enhanced.

Furthermore, the linear vibration generating apparatus according to an exemplary embodiment of the prevent invention includes a plurality of collision preventing parts, enhancing the reliability of a product and extending the life of the product.

In addition, the linear vibration generating apparatus according to exemplary embodiments of the prevent invention may have various shapes for the upper yoke, preventing the vibrating force of the vibrator from being lowered.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A linear vibration generating apparatus, the apparatus comprising:
a stator including a bracket, a coil inserted into the bracket, and a central yoke concentrically fixed to an interior space of the coil and inserted into the bracket;
a vibrator including a permanent magnet disposed to surround an outer periphery of the coil; and
a resilient body fixed to the stator to support the vibrator,
wherein the central yoke comprises an upper portion peripherally surrounded by the permanent magnet and the upper portion comprising a larger diameter than that of the coil.

2. The apparatus of claim 1, wherein a fixing part into which the central yoke is inserted is provided at a center of the bracket.

3. The apparatus of claim 2, wherein the fixing part has a hollow portion protruding upward from the center of the bracket.

4. The apparatus of claim 3, wherein the central yoke includes a body portion inserted into the coil and disposed within the coil, the upper portion extending to the outside from the body portion to protect the coil, and a lower portion having a diameter smaller than that of the body portion and protruding to a central lower side from the body portion to be inserted into and press-fitted with the hollow portion, and wherein the body portion, the upper portion, and the lower portion each comprise a cylindrical shape.

5. The apparatus of claim 4, wherein the central yoke further includes an upper end portion protruding to a central location of an outer case from the cylindrical upper portion to align the coil and the central yoke concentrically, and wherein the upper end portion comprises a cylindrical shape.

6. The apparatus of claim 5, further comprising the outer case including a concentricity opening, wherein the outer case is coupled to the bracket, wherein the concentricity opening is concentrically aligned with the fixing part to thereby position the central yoke to protect the stator and the vibrator, and wherein an upper end of the upper end portion is caught by the concentricity opening of the outer case.

7. The apparatus of claim 6, wherein the concentricity opening has a diameter larger than that of the upper end portion and smaller than that of the lower portion.

8. The apparatus of claim 4, wherein the permanent magnet includes an upper plate and a lower plate on upper and lower surfaces thereof, respectively, and wherein a weight body is attached to an outer perimeter of the permanent magnet.

9. The apparatus of claim 8, further comprising:

a first vertical impact preventing part on the upper plate, wherein the first vertical impact preventing part includes a magnetic fluid.

10. The apparatus of claim 8, further comprising:

a second vertical impact preventing part on the bracket, wherein the second vertical impact preventing part is formed of at least one of a rubber, a silicon resin, and an expandable resin sponge.

11. The apparatus of claim 8, wherein the permanent magnet further includes a weight body.

12. The apparatus of claim 11, further comprising:

a third vertical impact preventing part on an upper surface of the weight body, wherein the third vertical impact preventing part is formed of at least one of a rubber, a silicon resin, and an expandable resin sponge.

13. The apparatus of claim 2, further comprising:

a horizontal impact preventing part between the permanent magnet and the upper portion, wherein the horizontal impact preventing part includes a magnetic fluid.

14. The apparatus of claim 8, further comprising:

a fourth vertical impact preventing part between the weight body and an outer peripheral surface of a lower plate, wherein the fourth vertical impact preventing part includes a magnetic fluid.

15. The apparatus of claim 6, wherein the bracket is coupled to the outer case to protect the stator and the vibrator and the central yoke is fixed to the outer case concentrically with the coil.

16. The apparatus of claim 15, wherein a hollow part into which the central yoke is inserted to be fixed protrudes downward from an upper surface of the outer case.

17. The apparatus of claim 15, wherein the central yoke is welded to an upper surface of the outer case to be fixed.

18. The apparatus of claim 15, wherein the central yoke is inserted into the concentricity opening formed on the upper surface of the outer case to be fixed.

19. The apparatus of claim 4, wherein the central yoke extends to the outside from a cylindrical body portion, and wherein a shape of the extending outer peripheral portion of the central yoke has at least one rounded corner.

20. The apparatus of claim 19, wherein the shape of the outer peripheral portion of the central yoke is substantially at least one of an equilateral triangle and a square whose corners are rounded.

21. The apparatus of claim 3, wherein the central yoke includes:

a cylindrical body inserted into and disposed within the coil;

a cylindrical upper portion extending radially from the cylindrical body to protect the coil;

a cylindrical lower portion whose diameter is smaller than that of the body and protruding to a central lower side from the body to be inserted into and press-fitted with the fixing part;

a cylindrical upper end portion protruding from the cylindrical upper portion to a central lower side to help adjust a concentricity of the coil and the central yoke; and a cylindrical boss protruding from the cylindrical upper end portion to a central lower side to help adjust the concentricity of the coil and the central yoke.

22. The apparatus of claim 21, wherein the bracket is coupled to the outer case to protect the stator and the vibrator and a hollow part where the cylindrical boss is disposed protrudes and extends downward from the center of the upper surface of the outer case.

23. The apparatus of claim 22, wherein an inner diameter of the hollow part is larger than an outer diameter of the cylindrical boss and an outer diameter of the cylindrical upper portion, whereby a gap exists between the inner surface of the hollow part and the outer surface of the cylindrical boss.

* * * * *